United States Patent Office 3,502,578
Patented Mar. 24, 1970

3,502,578
CORROSION INHIBITING METHOD AND
COMPOSITION THEREFOR
Philip J. Raifsnider, Denver, Colo., assignor to Shell
Oil Company, New York, N.Y., a corporation of
Delaware
No Drawing. Continuation-in-part of application Ser. No.
260,289, Feb. 21, 1963. This application June 30, 1966,
Ser. No. 561,734
Int. Cl. C23f 11/00; E21b 43/20
U.S. Cl. 252—8.55    3 Claims

ABSTRACT OF THE DISCLOSURE

A new and novel corrosion inhibitor for use on ferrous metals in contact with aqueous and nonaqueous fluids and fluids containing said inhibitor, which inhibitor is an adduct formed by reacting a $C_{8-32}$ alkyl substituted 5- or 6-membered cyclic amidine with at least one mol of $SO_2$ in an anhydrous medium.

This application is a continuation-in-part of my application Ser. No. 260,289, filed Feb. 21, 1963, which has been abandoned.

This invention relates to a corrosion inhibiting composition and a method for inhibiting corrosion of ferrous materials such as ferrous metal pipes, tubings, casings and the like, which are generally attached by corrosive materials encountered in the production, recovery and transportation of oil or various corrosive aqueous or non-aqueous fluids. The invention particularly relates to corrosion inhibition of piping systems used in water-flooding operations and for transporting corrosive aqueous and nonaqueous fluids.

The corrosion inhibitors of the present invention are adducts formed by reacting $C_{8-32}$ alkyl substituted 5- or 6-membered cyclic amidines such as $C_{8-30}$ alkyl substituted imidazolines and tetrahydropyrimidines with at least one mol of sulfur dioxide in an anhydrous medium such as an alcoholic medium so as to form products having at least one and preferably more than one such as 2 or 3

units in the adduct molecule. In general the amount of sulfur dioxide used to form the adducts of the present invention should be such as to react with at least one and preferably all of the basic nitrogen atoms present in the cyclic amidine compound.

The 5- or 6-membered cyclic amidines can be represented by the partial formula

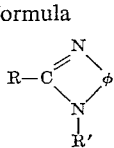

where R is a $C_{8-32}$ alkyl or cycloalkyl radical, R' can be hydrogen or the same as R or a radical —X—R″ where X is a divalent organic radical and R″ is a polar group such as a hydroxy group or an amino group or an amino alkylene substituted imino group and $\phi$ is —CHR‴—$CH_2$ or CHR‴—CHR‴—CHR‴— group where the R‴ can be hydrogen and/or lower alkyl groups having from 1 to 4 carbon atoms and preferably R‴ is hydrogen.

A preferred class of compounds represented by Formula I may be alkyl substituted imidazoline or pyrimidine having respectively the formulas

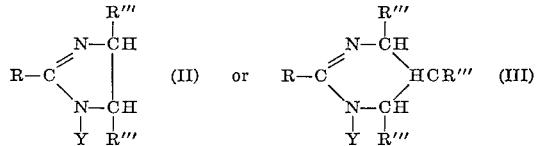

where R and R‴ are the same as defined in (I) and Y is hydrogen or —$CH_2CH_2$—OH or $CH_2CH_2$—$NH_2$ or $(CH_2CH_2$—$Z)_xCH_2CH_2$—$NH_2$ where Z is —NH, —O— or —S— preferably —NH and x is an integer of from 1 to 4, preferably 1. Preferred compounds are represented by Formula II where R‴ is hydrogen and Y is —$CH_2CH_2$—OH or —$CH_2CH_2$—$NH_2$.

The cyclic amidines are well-known compounds and can be prepared by methods described in U.S. Patents 2,267,965; 2,713,583; 3,116,249, and 3,159,510 and by the methods described by Fern and Riebsomer in Chemical Reviews, vol. 54, No. 4, August 1954. Specific examples of cyclic amidine useful to form sulfur dioxide adducts of the present invention are:

2-octyl imidazoline
2-decyl imidazoline
2-dodecyl imidazoline
2-heptadecyl imidazoline
2-octadecyl imidazoline
1-(2-hydroxymethyl)-2-decyl imidazoline
1-(2-hydroxyethyl)-2-undecyl imidazoline
1-(2-hydroxyethyl)-2-decyl imidazoline
1-(2-hydroxyethyl)-2-pentadecyl imidazoline
1-(2-hydroxyethyl)-2-heptadecyl imidazoline
1-(2-hydroxyethyl)-2-heptadecenyl imidazoline
1-(2-hydroxyethyl)-2-octadecyl imidazoline
1-hydroxyisopropyl-2-heptadecenyl-4-methyl imidazoline
1-hydroxyethylaminoethyl-2-decyl imidazoline
1-(2-aminoethyl)-2-decyl imidazoline
1-(2-aminoethyl)-2-undecyl imidazoline
1-(2-aminoethyl)-2-heptadecyl imidazoline
1-diaminodiethyl-2-undecyl imidazoline
1-(2-aminoethyl)-2-heptadecyl pyrimidine
1-(2-hydroxyethyl)-2-heptadecyl pyrimidine
1-diaminodiethyl-2-dodecyl pyrimidine Imidazoline compounds of the above type are available from National Aluminated Corporation under the trade name Nalcamines where the G–10 series contain the 1-(2-hydroxyethyl) radical and the G–30 series contain the 1-(2-aminoethyl) radical and are illustrated by 1-(2-hydroxyethyl)-2-heptadecyl imidazoline, 1-(2-hydroxyethyl)-2-heptadecenyl imidazoline and 1-(2-aminoethyl)-2-heptadecyl imidazoline. These Nalcamines are prepared by reacting polyalkylene polyamines or hydroxyalkyl alkylene polyamines with long chain saturated or unsaturated fatty acids, e.g., stearic or oleic acids.

The present invention is not limited to any specific method of preparing the subject corrosion inhibitors. One method of producing the adduct is by passing sulfur dioxide through an anhydrous solution containing a cyclic amidine such as an imidazoline. The reaction is generally exothermic so that heating is not required until the reaction is well under way or is completed and is used primarily to strip off the solvent if desired. Generally the solvent can be left and the adduct formed can be used as a concentrate additive. A particularly useful method for making adducts of the present invention is to form an alcoholic solution of a suitable imidazoline and pass gaseous sulfur dioxide therethrough until at least 1 mol of sulfur dioxide has reacted with the imidazolines and thereafter if desired the product can be gently heated under vacuum to strip off the alcohol such as methyl and/or isopropyl alcohol.

Excellent corrosion inhibitors of the present invention was obtained by dissolving 1-(2-hydroxyethyl)-2-heptadecenyl imidazoline in methyl alcohol and bubbling $SO_2$ through the solution until at least one mol of $SO_2$ reacted with the imidazoline. The mixture was then gently heated under vacuum to strip off a portion of the alcohol and the end product was an alcoholic adduct of $SO_2$-imidazoline which when added in from 10 to 50 p.p.m. to corrosive liquids, e.g., brine water, effectively inhibited pitting and corrosion of the pipes used to convey said corrosive liquid.

The following is an illustrative example identified below as adduct (A) of the manner in which the inhibitors of the present invention are prepared. About 40 grams of 1-(2-hydroxyethyl)-2-heptadecenyl imidazoline were dissolved in 40 grams of methanol, and the solution disposed in a suitable glass vessel. Thereafter, gaseous sulfur dioxide was bubbled through the solution. Since the reaction was exothermic, care was taken not to permit overheating. The reaction was terminated when about one mol of $SO_2$ reacted with the imidazoline. The reaction product was then subjected to gentle heating and a portion of the methanol was removed under vacuum. The reaction product was both water soluble and hydrocarbon soluble; and, a 1% solution of this product in water had a pH of 3.5.

Other illustrative examples of adducts of the present invention include:

(B) $SO_2$-2-octyl imidazoline adduct in methyl alcohol
(C) $SO_2$-2-decyl imidazoline adduct in isopropyl alcohol
(D) $SO_2$-2-dodecyl imidazoline adduct in methyl alcohol
(E) $SO_2$-2-heptadecyl imidazoline adduct in isopropyl alcohol
(F) $SO_2$-2-octadecyl imidazoline adduct in methyl alcohol
(G) $SO_2$-1-(2-hydroxymethyl)-2-decyl imidazoline adduct in methyl alcohol
(H) $SO_2$-1-(2-hydroxyethyl)-2-undecyl imidazoline adduct in ethyl alcohol
(I) $SO_2$-1-(2-hydroxyethyl)-2-decyl imidazoline adduct in methyl alcohol
(J) $SO_2$-1-(2-hydroxyethyl)-2-pentadecyl imidazoline adduct in methyl alcohol
(K) $SO_2$-1-(2-hydroxyethyl)-2-heptadecyl imidazoline adduct in methyl alcohol
(L) $SO_2$-1-(2-hydroxyethyl)-2-heptadecenyl imidazoline adduct in methyl alcohol
(M) $SO_2$-1-(2-hydroxyethyl)-imidazoline adduct in methyl alcohol
(N) $SO_2$-1-hydroxyisopropyl-2-heptadecenyl-4-methyl imidazoline adduct in butyl alcohol
(O) $SO_2$-1-hydroxyethylaminoethyl-2-decyl imidazoline adduct in methyl alcohol
(P) $SO_2$-1-(2-aminoethyl)-2-decyl imidazoline adduct in methyl alcohol
(Q) $SO_2$-1-(2-aminoethyl)-2-undecyl imidazoline adduct in isopropyl alcohol
(R) $SO_2$-1-(2-aminoethyl)-2-heptadecyl imidazoline adduct in methyl alcohol
(S) $SO_2$-1-diaminodiethyl-2-undecyl imidazoline adduct in methyl alcohol
(T) $SO_2$-1-(2-aminoethyl)-2-heptadecyl pyrimidine adduct in methyl alcohol
(U) $SO_2$-1-(2-aminoethyl)-2-heptadecyl pyrimidine adduct in methyl alcohol
(V) $SO_2$-1-diaminodiethyl-2-dodecyl pyrimidine adduct in isopropyl alcohol In order to show the unexpected and superior preformance of the inhibitor additives of the present invention, a series of static tests were performed using a known additive and comparing its results with those obtained with adduct (A) of the present invention. These tests also included a blank in which no additive was used in the brine. In these tests one-quart bottles were filled with a 3% aqueous sodium chloride solution which was air-saturated by bubbling air therethrough. In each bottle a 1/16" x 1/2" x 2" ground carbon steel specimen was suspended from a glass rod (passing through the cork stopper in the bottle), the steel rods being completely immersed in the brine solution which was in each case maintained at about 70° F.

In the first test, in which no additive was incorporated into the brine solution, the steel specimen was found to be rusted at the end of about 1/2 hour. Also, the saline solution at the end of this time was found to have an oxygen concentration of 6 p.p.m.

In the second test 0.05 wt. percent (based on the saline solution) of 1-(2-hydroxyethyl)-2-heptadecenyl imidazoline was added to the brine. The steel specimen in this case rusted in about 2 hours, and an analysis of the solution at the end of the test likewise shows an oxygen concentration of 6 p.p.m.

In comparison, when 0.05 wt. percent of adduct (A) was used as the additive in the aforementioned static test, the suspended carbon steel specimen was found to be clean, there being substantially no rust thereon at the end of 89 hours of suspension thereof in the thus inhibited air-saturated brine solution. The loss in weight of the specimen at the end of the 89 hours was only about 3.0 ml. The oxygen concentration at the end of the test was about 0.1 p.p.m. Substantially the same result is obtained when the last-mentioned reaction product is used as a corrosion inhibitor in an amount of only about 0.015 wt. percent.

Results comparable to adduct (A) were also obtained when adducts (E), (K), (R), (S) and (T) were used in the above test.

In a salt water disposal system about 10 p.p.m. of adduct (A) was injected in approximately 70 barrels of salt water and after 10 months of operation of the system in which the salt water is pumped from storage tanks to casing annuli for disposal, no corrosion of the spark plug probes or casing or other parts of the system were noted. Analyses at short intervals also showed that adduct (A) is an effective oxygen scavenger for this system. On the other hand injecting 10 p.p.m. of sodium sulfite solution into 70 barrels of salt water in this disposal system resulted in spark plug corrosion probes and casing corrosion in less than one month of operation of the system.

In the above disposal system inhibited with 10 p.p.m. of adduct (A) a conventional corrosemeter probe exposed for one month period showed zero micro inches of corrosion occurred. Without the inhibitor an exposure of the same probe showed that 80 microinches of corrosion occurred for the same time period.

Corrosion inhibitors of the present invention can be used to inhibit corrosion of ferrous metals used in various industrial applications.

I claim as my invention:

1. The method of preventing corrosion of ferrous metals in contact with flooding water used in secondary oil recovery comprising introducing into the flooding water an adduct obtained by reacting under anhydrous conditions a $C_{8-32}$ alkyl substituted cyclic amidine compound presented by the formulas selected from the group consisting of

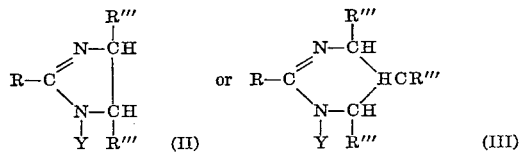

where R is $C_{8-32}$ alkyl, R''' is hydrogen or lower alkyl and Y is hydrogen or —$CH_2CH_2$—OH or $CH_2CH_2$—$NH_2$ or ($CH_2CH_2$—Z)$_x$$CH_2CH_2$—$NH_2$ where Z is —NH and $x$ is an integer of from 1 to 4, with sulfur dioxide until at least one mol of sulfur dioxide has reacted with a basic nitrogen atom of the cyclic amidine compound.

2. The method of claim 1 wherein the cyclic amidine compound is 1-(2-hydroxyethyl)-2-heptadecenyl imidazoline and the reaction is carried out in the presence of methyl alcohol.

3. The method of claim 1 wherein the cyclic amidine compound is 1-(2-aminoethyl)-2-heptadecenyl imidazoline and the reaction is carried out in the presence of methyl alcohol.

References Cited

UNITED STATES PATENTS

| 2,468,163 | 4/1949 | Blair et al. | 252—8.55 |
| 3,119,447 | 1/1964 | Raifsnider et al. | 252—8.55 X |
| 3,121,091 | 2/1964 | Green | 252—8.55 X |

HERBERT B. GUYNN, Primary Examiner

U.S. Cl. X.R.

21—2.7; 166—275; 252—391; 260—251, 256.4, 309.6